United States Patent

[11] 3,627,363

| [72] | Inventor | Harold S. Van Buren, Jr. Lexington, Mass. |
|---|---|---|
| [21] | Appl. No. | 65,829 |
| [22] | Filed | Aug. 21, 1970 |
| [45] | Patented | Dec. 14, 1971 |
| [73] | Assignee | TRW Inc. Cleveland, Ohio |

[54] FASTENER FOR SECURING A MEMBER TO A SHAFT END
6 Claims, 6 Drawing Figs.

| [52] | U.S. Cl. | 287/53 H, 74/548 |
|---|---|---|
| [51] | Int. Cl. | F16d 1/06 |
| [50] | Field of Search | 287/53 H; 74/548; 292/353, 349, 336.5 |

[56] References Cited
UNITED STATES PATENTS

| 2,153,919 | 4/1939 | Forsythe | 287/53 H |
|---|---|---|---|
| 2,153,950 | 4/1939 | Whinery | 287/53 H |
| 2,745,689 | 5/1956 | Balint et al. | 287/53 H |
| 3,425,723 | 2/1969 | Parkin et al. | 287/53 H |

*Primary Examiner*—Andrew V. Kundrat
*Attorneys*—Philip E. Parker, James R. O'Connor, Hall and Houghton and Gordon Needleman ABSTRACT: A fastener for releasably securing a knob or the like member to a shaft end, wherein the knob has an open end cavity formed therein and a pair of opposed, relatively narrow slots extending along side the cavity in open communication therewith. The fastener has an open ended shaft receiving and retaining housing adapted to be seated in the knob cavity and a pair of relatively rigid wings joined to and extending laterally outwardly from the housing. The wings are adapted to seat in the opposed slots in the knob when the housing is pressed into the cavity. Each of the wings carries a barblike projection which bitingly grips the surfaces of the knob adjacent the slots to secure the fastener in the assembly. A leaf spring disposed within the housing is adapted to be placed in tensioned retaining engagement with a surface area of a shaft end inserted into the fastener housing.

PATENTED DEC 14 1971 3,627,363

INVENTOR
HAROLD S. VAN BUREN JR.
BY
James R O'Connor
ATTORNEY

3,627,363

FASTENER FOR SECURING A MEMBER TO A SHAFT END

BACKGROUND OF THE INVENTION

1. Field of the Invention

The invention relates to knob or the like operating member connections to shaft ends and fasteners used for effecting such connections of the type found in U.S. Art Class 287, Subclass 53, entitled "Rod Joints or Couplings—Shaft End Attached."

2. Description of the Prior Art

The prior art includes a number of spring clips or fasteners which are adapted for assembly in a cavity or recess formed in a knob or handle so as to provide a releasable connection with a shaft to which the knob or handle is to be attached. In many instances a fastener carries a spring element disposed externally of a shaft receiving housing which spring element is adapted to lock in a notch in the shaft end or to engage the shaft end in a ratchetlike fashion. To remove the knob from the shaft one must first depress the spring element from its shaft engaging attitude and while holding the spring element in the depressed condition pull the knob or handle from the shaft. In certain instances assembling the knob with the shaft end necessitates a preliminary depression of the locking spring element. This type of fastener has proved quite advantageous for use in securing knobs or handles to relatively rugged mechanical linkages, for example, automobile gear shift levers, brake release levers, air vent baffle operating levers, etc., wherein substantial pull is exerted on the knob or handle and the linkage and intentional removal of the knob or handle is contemplated to be very infrequent. Conversely, the same types of knob or handle fasteners are not particularly attractive for use with shafts which operate more delicate mechanisms such as electrical circuit controllers in that either an intentional or more likely an unintentional excessive pull exerted on a knob which is positively locked to the shaft will often result in unwarranted damage to the component parts of a more delicate mechanism such as a selector switch or tuning device. Further, it is somewhat inconvenient to utilize positive locking fasteners with apparatus such as TV sets, radios, and the like appliances wherein knobs or handles must frequently be first disengaged from component operating shafts before cover plates, backing panels, etc., can be removed from a chassis frame incident to repair or replacement of internal components of the apparatus.

Many of the prior art fasteners both of the positive locking or press fit shaft engaging type are characterized by a separate, sheet metal shaft receiving housing which is shaped according to the cross-sectional contour of the shaft to be engaged, i.e., the fastener housing has a D-shape or a rectangular shape, or a triangular shape, etc. The purpose of the corresponding cross-sectional configuration is to prevent relative rotation between the fastener or shaft when connected. Likewise, the cavity or recess in a knob or handle must be contoured to conform to the fastener and shaft contour to facilitate installation of the fastener therein. Since relative rotation between the installed fastener and the knob or handle is likewise unacceptable, the dimensional tolerances of the fastener receiving cavity or recess must be closely held to insure a snug press fit assembly of the fastener in the cavity which will inhibit relative rotation of those components and will also insure an inward compression of the split, sheet metal fastener housing to provide for close envelopment about the external surfaces of the seated shaft end. Thus, the effective functioning of the shaft engaging and retaining elements of the fastener is to a considerable extent dependent on the maintenance of predetermined dimensioning and shaping of both the fastener and the knob or handle cavity in which it is seated. Past experience indicates that even minor deviations from the prescribed tolerances may result in a defective assembly and connection. Further, one must maintain a substantial inventory of differently sized fasteners for use with knobs or handles having differently sized cavities or recesses and to accommodate various sizes of shaft ends.

The principal motivating force behind the development of the fastener disclosed herein was the recognition of the need in the art for an improved fastener for attaching knobs or handles to shafts which operate delicate mechanisms such as electrical switches. To that end I have developed a fastener which provides for an effective connection to a shaft under normal conditions of usage but which can be assembled with a shaft or disconnected therefrom responsive to the application of a relatively minimal force (i.e., a push or pull on the order of 5 lbs.) to the knob or handle. Further, in my improved fastener the means which retain the fastener in assembly with the knob or handle function totally independently of the shaft securing and retaining means thereby rendering the fastener adaptable for use with knobs or handles having substantial dimensional variations in the shaft receiving cavities or recesses formed therein.

The aforementioned improvements have been accomplished while maintaining the necessary resistance to relative rotation of the components in a knob to shaft connection which is characteristic of the prior art devices.

Further appreciation of the improved fastener's contribution to the art will be realized by having reference to the detailed description of same which follows hereinafter.

SUMMARY OF THE INVENTION

A fastener for releasably securing a shaft end to a knob having a bore formed therein and a plurality of relatively shallow slots extending along side the bore and in open communication with the bore. The fastener has an open end shaft receiving housing adapted to be seated in the bore in the knob and the said open end has a cross sectional configuration generally corresponding to the cross sectional contour of the shaft end to be received therein. The housing carries a spring element bent to define a constriction therein rearwardly of the open end, which spring is adapted to be placed in tensioned engagement with a portion of the shaft end responsive to insertion of same into the housing. The fastener additionally includes a plurality of laterally extending wings joined to the said housing rearwardly of the open end thereof. The wings are adapted to seat in the slots in the knob when the housing is installed in the bore. Each of the wings carries a barblike element which bites into and grips internal portions of the knob defining said slots to secure the fastener in the assembly.

DESCRIPTION OF THE PREFERRED EMBODIMENT

Figure 4:
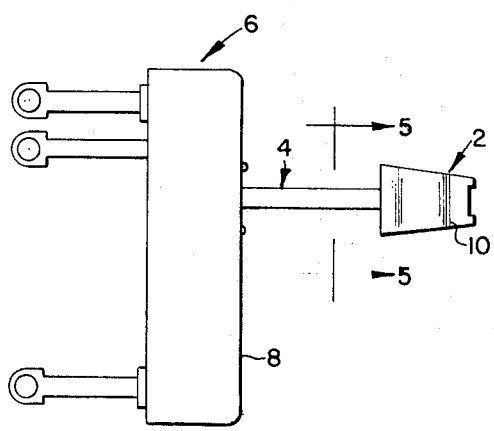
FIG. 4 is a plan view of an installation depicting a knob secured to the end of a shaft which operates the movable contact of a multicircuit controlling selector switch.

In the drawings, a preferred embodiment of the improved fastener is depicted as employed to connect a knob 2 to a shaft 4 which operates the movable contact of a multicircuit electrical control switch 6 which may constitute a component of a television set, a radio, a stereo record playing system or other similar equipment, shaft 4 being movable in a sliding motion longitudinally of the switch housing 8 as depicted in FIG. 4. In a typical installation, a switch housing would be mounted in the chassis of the equipment behind a detachable cover plate or backing panel having an elongated opening through which a portion of the shaft extends to permit operation of the switch by one grasping the knob 2 and moving the shaft longitudinally of the switch housing as aforesaid.

The knob 2 is cast or molded from any convenient material and in any desired outward configuration, and is specifically depicted as being of a molded synthetic plastic construction. The shaft 4 may likewise be formed from any convenient material and in this instance is also depicted as being of molded plastic. The shaft and particularly the end thereof to be connected to the knob has a generally rectangular cross-sectional configuration, which configuration has been found to be particularly advantageous in that the plastic material is easily molded or extruded in that shape and efficiency of operation is also enhanced.

Figure 6:
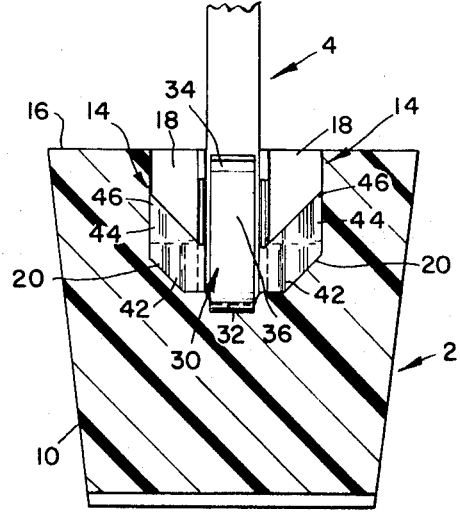
FIG. 6 is a plan view of a transverse cross section of the assembly as depicted in FIG. 5 with the fastener and shaft end shown in full.

The body 10 of the knob 2 is formed with an enlarged generally rectangular cavity 12 and a pair of opposed relatively shallow slots 14 extending along side the cavity and in open communication with the cavity. The slots 14 are located generally equidistant from the top and bottom walls of the cavity and as best seen in FIG. 6 the overall depth of the cavity is slightly greater than the depth of the slots. Both the cavity and the slots have open ends adjacent the front face 16 of the knob. The forward portions 18 of the slots are generally rectangular and the rearward portions are at least partially defined by a back wall 20 disposed at an angle of approximately 45° to the internal sidewalls of the cavity.

Figure 1:
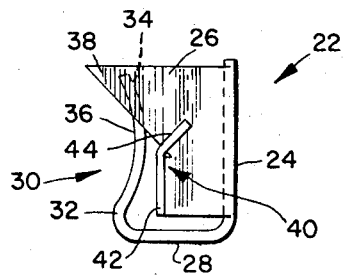
FIGS. 1, 2 and 3 are a side elevational, end elevational, and plan view, respectively, of a fastener according to the invention.
Figure 2:
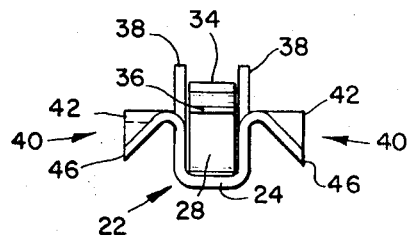
Figure 3:
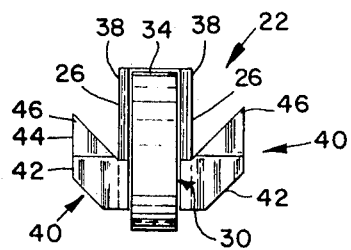

Referring now more particularly to FIGS. 1, 2 and 3, there is shown the improved fastener 22 which is a one-piece, formed stamping of relatively thin spring metal, for example, 0.012 inch thick tempered carbon steel. The body of the fastener comprises a relatively rigid shaft receiving housing defined by a generally flat base portion 24, a pair of upstanding parallel sides 26, and a back portion 28 extending upwardly from the base but spaced from the sides 26. A leaf spring 30 is joined to the upper end of back portion 28 through a reversely bent web 32 and extends forwardly therefrom in a generally concavo-convex arcuate contour between the sides 26 and in spaced relationship to the base 24 and terminates in a free end section 34 lying adjacent the forward edges of the sides 26. The free end section 34 of the spring cooperates with the base 24 and sides 26 to define a generally rectangular open entrance to the shaft receiving housing with the upwardly curved free end of the spring providing a lead-in to the housing and the medial portion 36 of the spring providing a constriction in the housing rearwardly of the entrance thereto. As best seen in FIGS. 1 and 2 the upper ends 38 of the sides 26 lie above the level of leaf spring 30.

Wings 40 are joined to the medial lateral portions of the rearward sections of the sides 26 and extend laterally outwardly therefrom. Each of the wings has a generally parallelogrammic configuration with the forward and rearward edges thereof lying at an angle of approximately 45° to the plane of the sides 26. Each of the wings has a rearward section 42 having an irregular polygonal configuration which section is joined along the length of one edge thereof to a side 26 and lies generally perpendicular to the plane of the side. The rearward wing sections 42 are flat and relatively rigid. The forward section 44 of each wing is generally triangular in shape and is turned downwardly toward the plane of base portion 24 and terminates in a sharply pointed, barblike free end 46.

Figure 5:
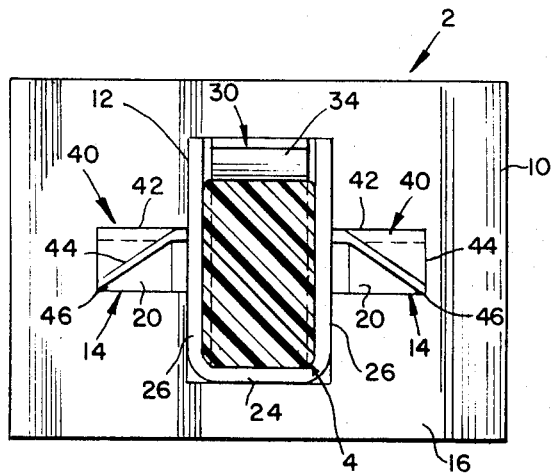
FIG. 5 is a cross section taken on line 5—5 of FIG. 4.

The fastener 22 may be assembled with the knob 2 by hand or by utilizing conveniently designed hand operated or automatic attaching tools. The assembly is accomplished by inserting the shaft receiving housing into the cavity 12 in the knob with the back portion 28 leading and the wings 40 aligned with the slots 14 and thence forcing the housing into the cavity until the back portion bottoms on the rear wall of the cavity and the rearward edges of the wing sections 42 seat against the inner walls 20 of the slots 14. During insertion, the flat upper faces of the wing sections 42 slide beneath and along the upper walls of the slots 14 and the free ends 46 of the wings are guided into the slots adjacent the lower outboard corners thereof. Since the forward wing sections are characterized by a capacity for slight springlike deflection about the bend in the wings, the ends 46 do not appreciably cut into or score the adjacent surfaces of the knob during insertion. Further, this capacity for deflection allows for low side tolerance variations in the height of the slots 14 without appreciable impedance to insertion of the fastener. However, once the fastener is fully seated, the barblike ends 46 of the wings will bite into the surfaces of the knob adjacent the corners of the slots to effectively resist separation of the components during normal conditions of usage. Ideally the relative dimensional relationships between the cavity 12 in the knob and the shaft receiving housing of the fastener are such that the latter makes a snug press fit in the cavity as is depicted in FIG. 5. Since the upper ends 38 of the sides 26 lie above the level of the spring 30 there will always be a gap between the spring 30 and the knob or upper wall of the cavity when the ideal press fit condition obtains. Moreover, the sharply pointed configuration of the side ends 38 will cut into the plastic material of the knob if necessary to effect seating of the fastener in situations where low side tolerance variations exist in the height of the cavity 12. Obviously, however, there are low side limits to the size of cavity which will accept a given size fastener without precipitating fracture of splitting of the knob or compressing the fastener housing to such a degree that it is difficult to seat the fastener on a shaft or the on-off action becomes so hard that the design objective of the fastener is defeated. On the other hand, the fastener's design permits considerable latitude with respect to high side dimensional variations in cavity size, in that even if all outer surfaces of the shaft receiving housing are spaced from the walls of the knob cavity, the wings 40 will maintain a secure grip on the knob to effectively resist both separation and relative rotation of the components. Even if the slots 14 are laterally elongated, the barblike ends 46 of the wings will engage the floor of the slots more centrally thereof rather than adjacent the corners thereof and effectively inhibit separation. Thus, it becomes evident that in the fabrication of the knob the only critical dimension which must be closely held is the high side tolerance on the height of the slots 14 to insure that the ends of the wings of a given fastener are presented with a surface to engage, and it becomes further evident that if this critical dimension is met a given size fastener may be effectively utilized with a wide range of knob sizes having differently sized shaft receiving cavities.

To connect the subassembly of knob and fastener to the shaft 4, the free end of the shaft is introduced into the open end of the shaft housing and the knob is thereafter pressed forwardly until the leading end of the shaft bottoms on the back portion 28 of the fastener. The upwardly bowed free end section 34 of the spring 30 provides a convenient lead-in to guide the shaft into the housing during initial insertion. The height or thickness of the shaft 4 is at least slightly greater than the distance between the undersurface of the medial portion 36 of the spring 30 and the opposed surface of the base 24, whereby the spring is deflected toward the knob or upper wall of the cavity 12 as the shaft end is fully seated and the spring thereafter maintains a constant retaining bias on an area of the adjacent surface of the shaft end. As was earlier mentioned, a force on the order of 5 lbs. push or pull is required to seat the fastener on the shaft end or to remove same therefrom. Thus there is sufficient holding power in the connection to retain the parts in assembly under normal conditions of usage, i.e., as depicted in FIG. 4 for manipulation of the knob and shaft longitudinally of the switch housing shown therein. However, the 5 lbs. retaining tension permits ready intentional removal of the knob incident to removal of a backing panel or cover plate for repair of equipment housing the switch component, and, what is more important, permits unintentional disconnection of the knob from the shaft responsive to a pull on the knob of a magnitude that would tend to pull the shaft from the switch or otherwise damage the internal components of the switch if the fastener were in effect locked onto the shaft.

From a further consideration of FIGS. 5 and 6 in particular, it should become evident that the corresponding cross sectional configuration between the seated shaft and the fastener housing renders the fastener equally attractive for securing the knob to a rotary operative shaft as well as one designed for transverse sliding movement. Ideally the width of the shaft end is such that a press fit against the internal surfaces of the sides 26 of the fastener is obtained. However, even if the shaft end width is reduced and a gap exists between it and the fastener housing sides, the bias of the spring on the shaft continues to exert sufficient retaining force to provide an effective connection, although some lost motion may occur between the shaft and the fastener housing responsive to either linear or rotary movement of the knob. The same figures also demonstrate that the extension of the side ends 38 above the level of spring 30 provides a gap between the spring and the upper wall of the knob cavity 12, which gap is of sufficient depth to permit extensive vertical deflection of the spring and thereby renders the fastener capable of accommodating shaft ends having substantial high side variations in height or thickness tolerance. The reader should also be cognizant of two additional features which contribute to the versatility of the improved fastener, namely that it may be inverted 180° from the orientation with respect to the knob cavity depicted in the drawings and function equally efficiently in engaging both the knob and the shaft; and that in effecting the initial assembly of the components, the fastener may be first connected to the shaft and the knob thereafter pressed onto the fastener.

Having given due consideration to the above detailed description of the improved fastener one should now fully appreciate its contribution to the art, and for a precise definition of the spirit and scope of the invention reference should now be had to the appended claims.

I claim:

1. A fastener for releasably securing a shaft to a cooperating member, the cooperating member having a a bore formed therein and a plurality of relatively shallow slots formed therein and extending alongside the bore in open communication with the bore, said fastener comprising an open ended substantially channel shaped shaft receiving and retaining housing adapted to be seated in the bore, said open end of said housing having a cross-sectional configuration generally corresponding to the cross-sectional configuration of the shaft to be received and retained therein, said housing including a base portion, a back portion joined to said base portion at the end of said housing opposite said open end of said housing and a leaf spring joined to said back portion and extending therefrom toward said open end while overlying and being spaced above at least a portion of the top of the channel defined by said housing and said base portion in spaced, portion, said leaf spring defining a constriction in said housing rearwardly of said open end, said leaf spring being adapted to be placed in tensioned retaining engagement with a surface area of the shaft responsive to insertion of the shaft into said housing, and a plurality of relatively rigid wings joined to and extending laterally outwardly from said housing and disposed rearwardly of the said open end thereof, said wings being adapted to seat in said slots in said cooperating member when said housing is seated in the bore therein, said wings carrying barblike means adapted to bitingly grip the surfaces of said member proximate said slots to secure said fastener rigidly in said cooperating member.

2. A fastener according to claim 1 wherein said leaf spring includes a medial section projecting inwardly toward said base portion and a free end section adjacent the said open end of said housing projecting away from said base portion.

3. A fastener according to claim 1 wherein said housing includes spaced, generally parallel side portions projecting from said base portion and extending rearwardly toward said back portion, said leaf spring being disposed between said side portions and cooperating with said base portion and said side portions to define a generally rectangular shaft receiving channel in said housing, said channel extending from said open end rearwardly toward said back portion.

4. A fastener according to claim 1 wherein said leaf spring is joined to said back portion at the end thereof remote from said base portion through a reversely bent web and said spring has a bowed configuration defining a continuous arcuate contour from said web to the free end of said spring end adjacent the said open end of said housing.

5. A fastener according to claim 3 wherein said wings are joined to said side portions adjacent the ends thereof proximate said back portion and at points lying intermediate the planes of said base portion and said leaf spring.

6. A fastener according to claim 3 wherein each of said wings includes a rearward section extending laterally outwardly from one of said side portions in a plane generally parallel to an imaginary planar extension of said base portion and a forward section bent toward the plane of said base portion and extending toward the said open end of said housing and terminating in a sharply pointed free end providing said barblike means.

* * * * *

UNITED STATES PATENT OFFICE
CERTIFICATE OF CORRECTION

Patent No. 3,627,363     Dated December 14, 1971

Inventor(s) Harold S. van Buren, Jr.

It is certified that error appears in the above-identified patent and that said Letters Patent are hereby corrected as shown below:

Column 4, line 18, cancel "of", first occurrence, and insert --or--.

Column 5, line 43, after "spaced," insert --generally parallel relationship to said base--.

Signed and sealed this 10th day of July 1973.

(SEAL)
Attest:

EDWARD M. FLETCHER, JR.          RENE TEGTMEYER
Attesting Officer                Acting Commissioner of Patents